United States Patent
Kelly et al.

(10) Patent No.: US 7,351,010 B1
(45) Date of Patent: Apr. 1, 2008

(54) METHOD AND APPARATUS FOR SALVAGING UNDERWATER PIPELINES

(76) Inventors: John M. Kelly, 2459 Behrman Hwy., New Orleans, LA (US) 70114; Vito A. G. D'Angelo, #2 Adrian Ct., Waggaman, LA (US) 70094

( * ) Notice: Subject to any disclaimer, the term of this patent is extended or adjusted under 35 U.S.C. 154(b) by 46 days.

(21) Appl. No.: 11/380,274

(22) Filed: Apr. 26, 2006

Related U.S. Application Data

(60) Provisional application No. 60/691,655, filed on Jun. 17, 2005.

(51) Int. Cl.
*F16L 1/12* (2006.01)

(52) U.S. Cl. ........................ 405/158; 405/156

(58) Field of Classification Search ............ 405/156, 405/158, 166, 184.3
See application file for complete search history.

(56) References Cited

U.S. PATENT DOCUMENTS

| | | | |
|---|---|---|---|
| 1,326,460 A | 12/1919 | Lorenz | |
| 1,798,106 A | 3/1931 | Pels | |
| 1,986,633 A | 1/1935 | Hearing | |
| 2,135,911 A | 11/1938 | Ostberg | |
| 3,056,267 A | 10/1962 | McRee | |
| 3,578,233 A * | 5/1971 | Meister et al. | 405/156 |
| 3,817,133 A | 6/1974 | Romberg | |
| 4,091,514 A * | 5/1978 | Motes-Conners et al. | 405/156 |
| 4,124,015 A | 11/1978 | Isaksson | |
| 4,168,729 A | 9/1979 | Tausig et al. | |
| 4,197,828 A | 4/1980 | Schellhorn | |
| 5,139,006 A | 8/1992 | Trudeau | |
| 5,245,982 A | 9/1993 | Trudeau | |
| 5,413,086 A | 5/1995 | Trudeau | |
| 5,639,185 A * | 6/1997 | Saxon | 405/158 |
| 6,022,173 A * | 2/2000 | Saxon | 405/158 |
| 6,761,100 B1 | 7/2004 | Oncken | |
| 2006/0115331 A1 * | 6/2006 | Matteucci | 405/156 |

* cited by examiner

*Primary Examiner*—Frederick L. Lagman
(74) *Attorney, Agent, or Firm*—Garvey, Smith, Nehrbass & North, L.L.C.; Charles C. Garvey, Jr.; Seth M. Nehrbass

(57) ABSTRACT

A method of salvaging a pipeline in a marine environment is disclosed. The method provides a frame having a perimeter that surrounds a pair of opposed cutting blades, the frame having a gate that enables the frame to be selectively placed around or removed from a section of pipeline to be cut. As part of the method, the frame is placed on a pipeline by first opening the gate and then closing the gate once the pipeline is in an opening that is at the center of the frame. The center opening is generally rectangular in shape once the gate is closed. The cutter blades are moved toward one another, preferably with one blade being the moving blade and the other being a fixed blade. The cutter blades move toward one another until they overlap. At the time that they overlap, the cutter blades are prevented from deflecting in a direction normal to the direction of travel by a pair of guide rails that trap the moving blade in between the fixed blade and the guide rails. The pipeline to be cut is automatically centered within respective v-notched shaped blades prior to being severed as the blades advance relative to one another.

36 Claims, 8 Drawing Sheets

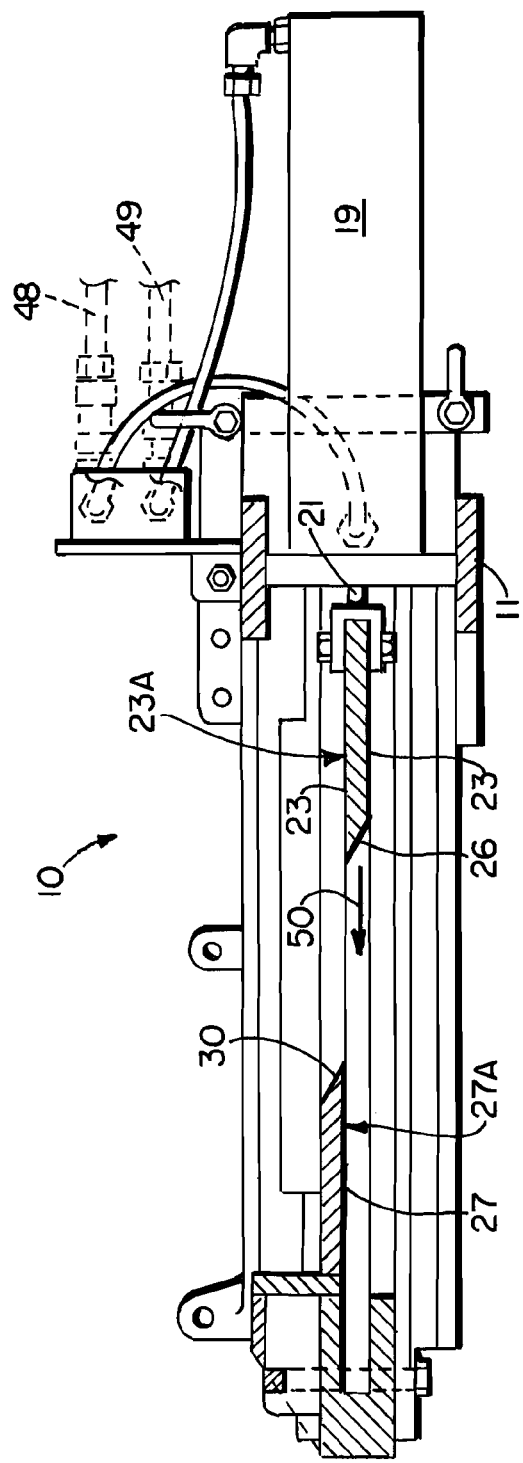
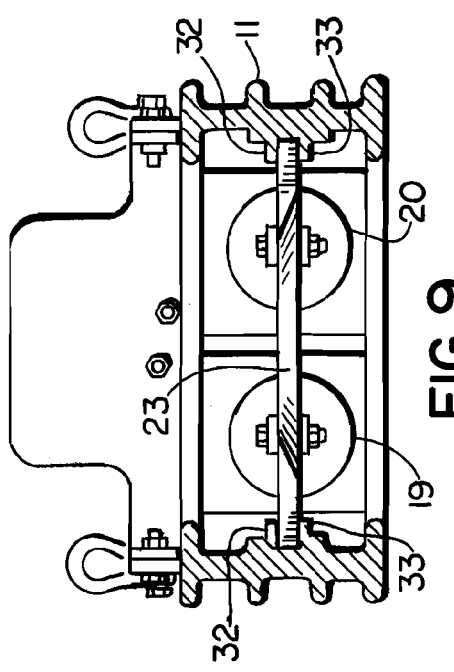
FIG. 8.
FIG. 9.

METHOD AND APPARATUS FOR SALVAGING UNDERWATER PIPELINES

CROSS-REFERENCE TO RELATED APPLICATIONS

Priority of U.S. Provisional Patent Application Ser. No. 60/691,655, filed Jun. 17, 2005, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a method and apparatus of salvaging underwater tubular elongated objects such as pipe/pipelines in a marine environment. More particularly, the present invention relates to an improved method and apparatus for removing pipelines and like objects from an underwater environment, the method employing a specially configured cutting apparatus having one or more hydraulic cylinders that push a moving v-shaped notched blade toward a fixed v-shaped notched blade, the blades overlapping during cutting and wherein structural rails or guides holds the moving blade in between the fixed blade and the rails or guides and wherein each blade has a beveled cutting edge that faces away from the beveled cutting edge of the other blade.

2. General Background of the Invention

In the offshore oil and gas industry and in other marine environments, there are a number of old, damaged or abandoned pipelines or sections of pipe that scatter the seabed. At times, catastrophic events such as hurricanes damage pipelines beyond repair so that they must be removed from the seabed with a salvage operation. Pipelines can be scattered over miles and in very deep water making salvage operations difficult and expensive.

The following possibly related U.S. patents are incorporated herein by reference:

TABLE

| U.S. PAT. NO. | TITLE | ISSUE DATE |
| --- | --- | --- |
| 1,326,460 | Shear Mechanism | Dec. 30, 1919 |
| 1,798,106 | Shears for Cutting Profiled Material | Mar. 24, 1931 |
| 4,168,729 | Underwater Self-Gripping Pile Cutting Device | Sep. 25, 1979 |
| 4,197,828 | Apparatus for Cutting Concrete Columns | Apr. 15, 1980 |
| 4,124,015 | Device for Cutting In Particular Reinforced Concrete Piles | Nov. 7, 1978 |
| 3,056,267 | Method and Apparatus for Removing from Submerged Sites Portions of Previously Driven Piles | Oct. 2, 1962 |
| 2,135,911 | Shearing or Cutting Tool | Nov. 8, 1936 |
| 3,817,133 | Glass Shear | Jun. 18, 1974 |
| 1,986,633 | Single Staying Machine Cutter | Jan. 1, 1935 |
| 6,761,100 | Stud Cutter | Jul. 13, 2004 |

BRIEF SUMMARY OF THE INVENTION

The present invention provides an improved method and apparatus for salvaging an abandoned, old, or damaged pipeline or section(s) of pipe in a marine environment. The method provides a frame having a perimeter that surrounds a pair of opposed v-shaped cutter blades. The frame has a gate that enables the frame to be selectively placed around or removed from a section of pipeline to be cut. In the preferred embodiment, a blade can be mounted on the gate.

As part of the method, the frame is placed on the pipeline by first opening the gate and then closing the gate. In some cases, the member to be cut is fed through the opening surrounded by the blades, without opening the gate. When the gate is in a closed position, the pipeline is positioned in between the two v-shaped cutting blades. Hydraulic cylinders are used to move one of the v-shaped cutting blades toward the other until they overlap, cutting the pipe. Each cutter blade has a first side that is flat and planar and a second side having a beveled edge. During cutting, the flat, planar sides of the blades abut and are held in such abutting relationship. The beveled edges face away from each other.

Each cutting blade has a notched, v-shaped cutting edge. The pipeline is thus automatically centered within the respective notched v-shaped blade edges prior to be being severed and as the blades advance relative to one another.

At least one of the blades has a v-shaped blade that defines an angle of about 90-170 degrees.

For each cutting blade, the beveled blade edge defines an acute angle of between about 10 and 45 degrees with the flat, planar surface of the blade.

One blade can be advanced toward the other using one, preferably two hydraulic cylinders. Thus, one of the blades moves and the other is fixed. Each hydraulic cylinder is preferably attached to the moving blade with a pinned connection.

The moving blade travels in opposed slots on the frame. Rails prevent the moving blade from deflecting laterally as it travels upon a selected guided path.

The two guides or rails also prevent deflection of the fixed blade.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 8 is a sectional view taken along lines 8-8 of FIG. 7;

FIG. 9 is a sectional view taken along lines 9-9 of FIG. 7;

DETAILED DESCRIPTION OF THE INVENTION

FIGS. 1-12 show generally the preferred embodiment of the apparatus of the present invention, wherein it is designated generally by the numeral 10. Pipe or pipe section cutting apparatus 10 provides a frame 11 to which is pivotally attached a gate 12. It should be understood that the apparatus 10 of the present invention can be used to cut material other than cylindrical pipe, such as tubing or piling (e.g. steel, wood, reinforced concrete or of composite construction).

Figure 11:
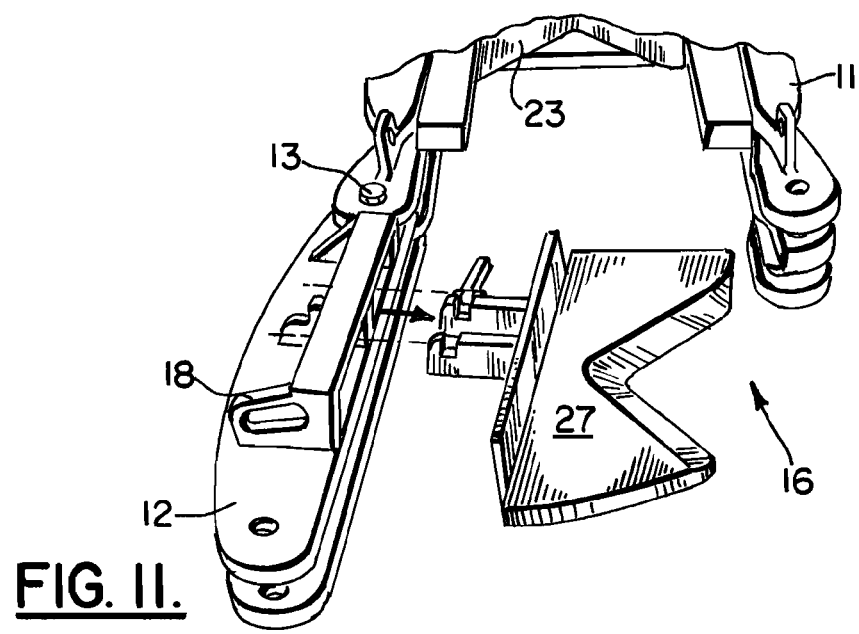
FIG. 11 is a partial perspective view of the preferred embodiment of the apparatus of the present invention illustrating blade removal.

Hinge 13 forms a pivoting connection between frame 11 and gate 12. Gate 12 can be closed and secured in the closed position with pinned connection 14. When the gate 12 is in a closed position (see FIG. 7), an open center 15 is provided, that being an area that is occupied by the pipeline to be cut during use. The apparatus 10 thus provides an open end portion 16 and a closed end portion 17. The gate 12 can be provided with a handle 18 that enables a user (e.g. diver) to open and close the gate 12 with respect to the frame 11. In FIG. 11, blade 27 can be removed from gate 12 and replaced with another blade such as the blades of FIGS. 14-17. Similarly, blade 23 is removable, replaceable from frame 11.

A pair of hydraulic cylinders 19, 20 are mounted to the frame 11 at the closed end portion 17. Each cylinder 19, 20 provides a moving pushrod. The cylinder 19 has a pushrod 21. The cylinder 20 has a pushrod 22. Moving blade 23 is attached to each of the pushrods 21, 22, preferably with pinned connections. The moving blade 23 provides a pair of cutting edges 24, 25 that form a "v" shape. Each edge 24, 25 provides a beveled surface 26.

Similarly, a fixed blade 27 is provided that has a pair of cutting edges 28, 29. As with the moving blade 23, the edges 28, 29 provide a "v" shape. The "v" shape for each of the blades 23, 27 forms a "v" that defines an acute angle 31 of about 90 degrees. Each beveled surface 26, 30 is beveled at an acute angle with respect to the plane of travel of the moving blade 23.

Each of the blades 23, 27 has a flat, planar surface. The blade 23 provides flat, planar surface 23A. The blade 27 provides flat, planar surface 27A. These flat, planar surfaces engage and abut, being positioned very closely together when cutting occurs. Each blade 23, 27 provides the beveled surface 26, 30 of each blade 23, 27 opposite the flat, planar surfaces 23A, 27A of the blades 23, 27. The blade 23 thus provides a beveled surface 26 opposite flat, planar surface 23A. Similarly, the blade 26 provides a beveled edge 30 opposite the planar, flat surface 27A. The flat, planar surfaces 23A, 27A can slide upon one another or be very closely spaced such as abutting or less than one millimeter apart during cutting.

When the moving blade 23 moves toward the fixed blade 27, it travels in slots on the frame. Guides 32, 33 are so positioned that they prevent lateral deflection of the blades 23, 27 when cutting occurs. This arrangement provides a very substantial, structurally robust construction that prevents deflection of either blade 23, 27 relative to the frame 11 in a transverse direction, i.e. a direction that is perpendicular to the path of travel 50 (see FIG. 8) of the moving blade 23.

The two hydraulic cylinders 19, 20 can be powered with hydraulic fluid. In that regard, each cylinder 19,20 is provided with a pair of hydraulic flowlines that enable the pushrods 21, 22 to be moved in either direction as selected. The hydraulic cylinder 19 thus provides a pair of hydraulic flowlines 34, 35. Similarly, the hydraulic cylinder 20 provides hydraulic flowlines 36, 37.

These hydraulic flowlines 34, 35, 36, 37 are provided with pressurized hydraulic fluid in a manner known in the art using a power unit such as hydraulic power unit, providing a hydraulic pump 40. The hydraulic power unit transmits pressurized fluid to the flowlines 34, 35, 36, 37 via flowlines 48, 49.

Figure 1:
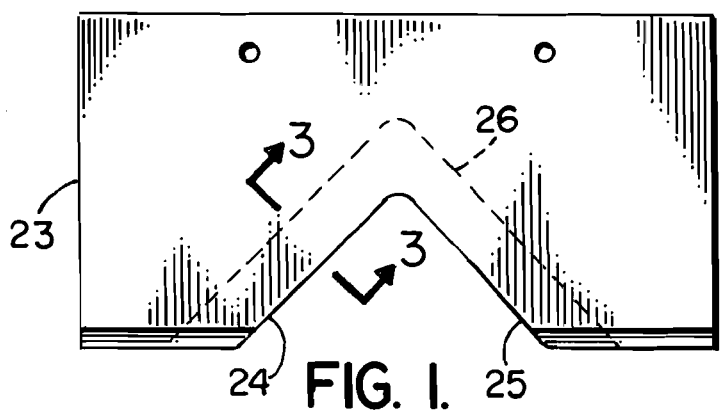
FIG. 1 is a partial plan view of the preferred embodiment of the apparatus of the present invention.
Figure 2:
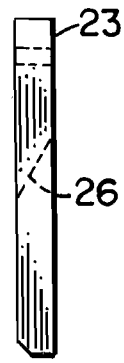
FIG. 2 is a partial side view of the preferred embodiment of the apparatus of the present invention showing the gate in a closed position.
Figure 3:
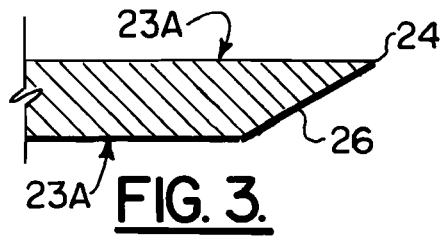
FIG. 3 is a sectional view taken along lines 3-3 of FIG. 1.
Figure 4:
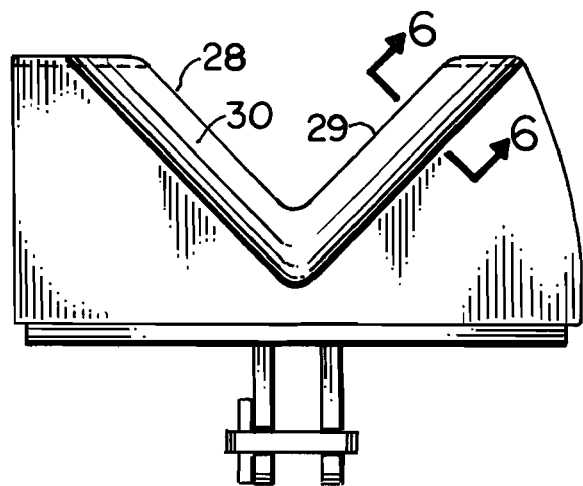
FIG. 4 is a partial plan view of the preferred embodiment of the apparatus of the present invention showing the gate in an open position.
Figure 5:
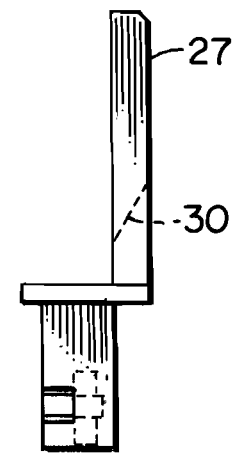
FIG. 5 is a partial side view of the preferred embodiment of the apparatus of the present invention.
Figure 6:
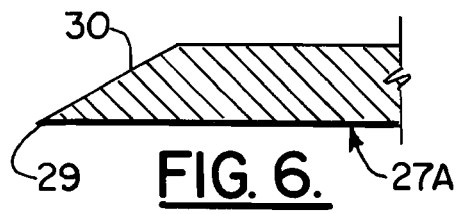
FIG. 6 is a sectional view taken along lines 6-6 of FIG. 4.
Figure 7:
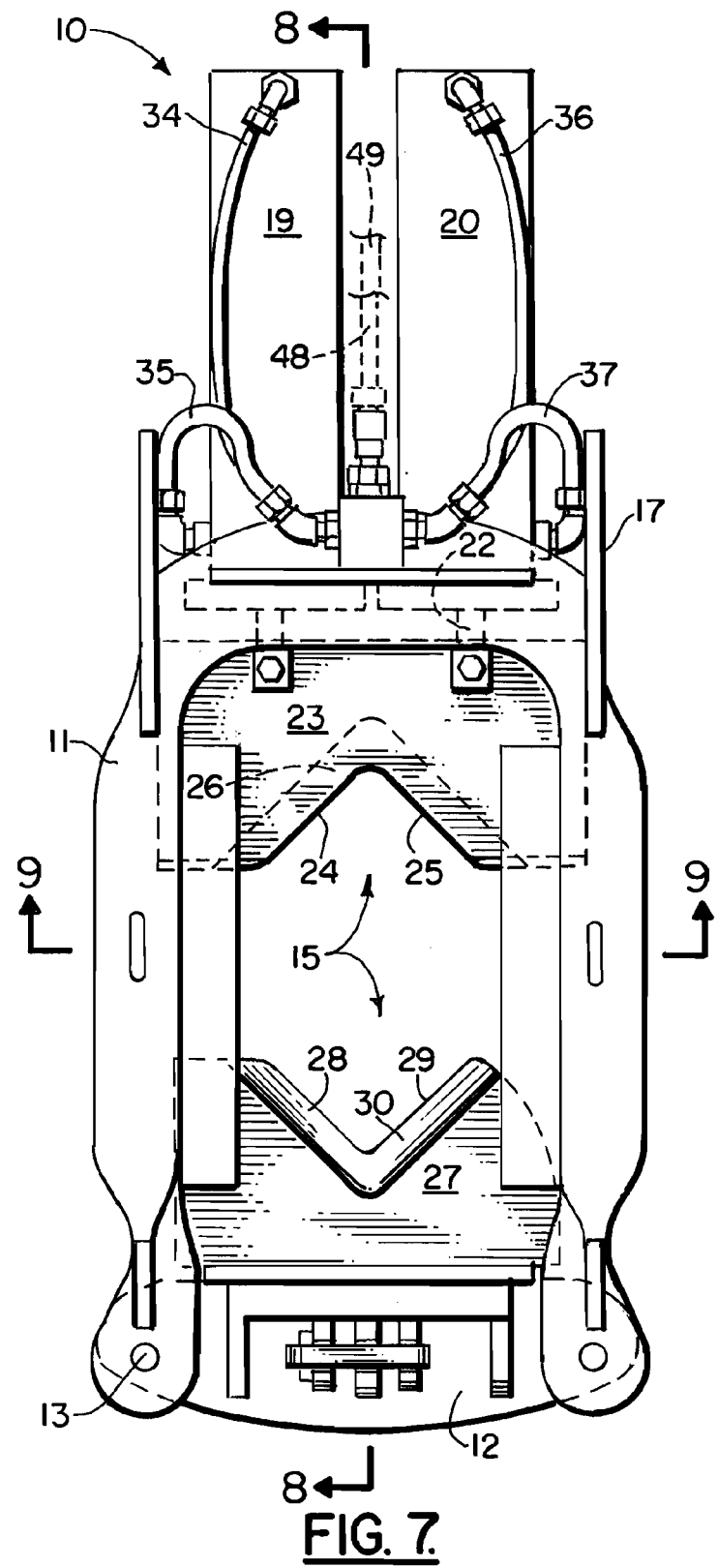
FIG. 7 is a plan view of the preferred embodiment of the apparatus of the present invention.
Figure 10:
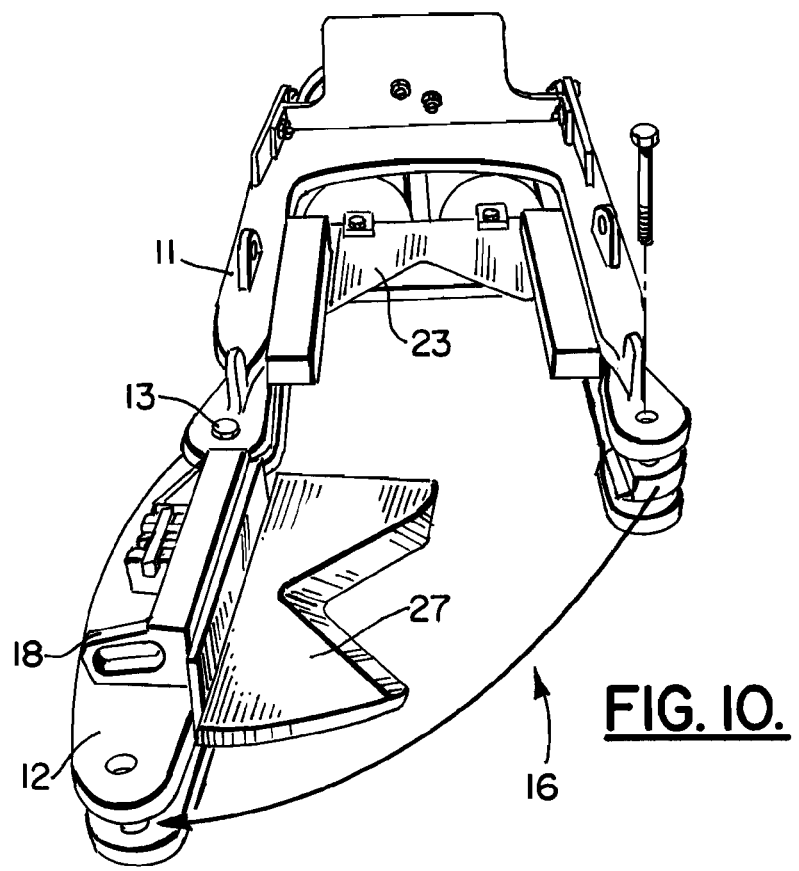
FIG. 10 is a perspective view of the preferred embodiment of the apparatus of the present invention illustrating an open position.
Figure 12:
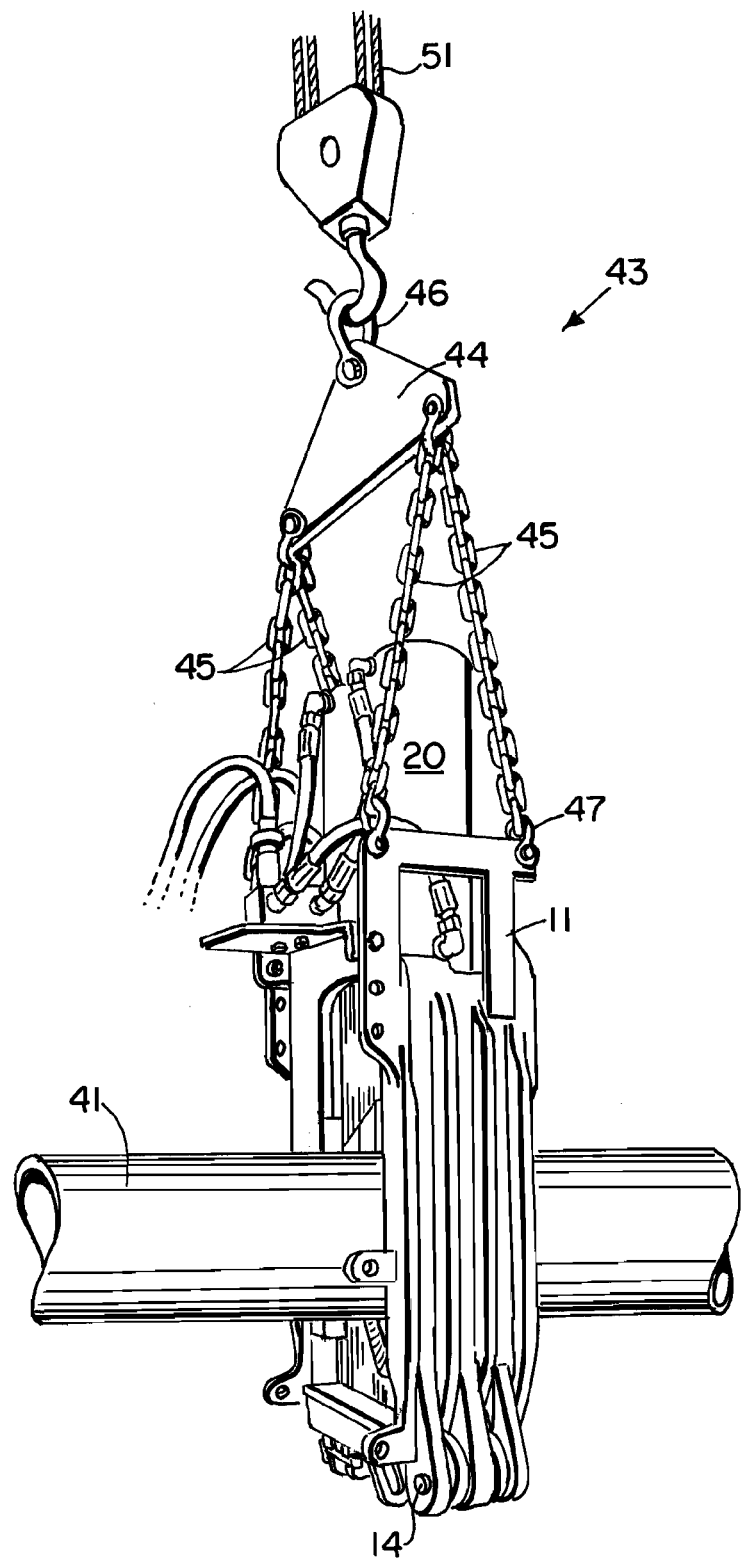
FIG. 12 is a perspective view of the preferred embodiment of the apparatus of the present invention showing a lifting harness lifting the apparatus and a section of pipeline positioned so that it is about to be cut.

A lifting harness 43 is shown in FIG. 12. Harness 43 can be used to lift the frame 11 of apparatus 10 during use. It should be understood that the frame 11 can be lifted in a vertical orientation as shown in FIG. 10 such as for example when lowering it into an underwater environment or when securing it vertically to the deck of a vessel such as a barge. Cutting of pipe 41 can take place on the deck of the barge or underwater or elsewhere. As used herein, the cutting or salvaging of a pipeline in a marine environment includes cutting the pipeline underwater or on the deck of a marine vessel or on the deck of a fixed platform that is constructed in a marine environment.

Harness 43 can include a spreader plate 44 that can be lifted with a crane or other lifting device that would attach a lifting line 51 to lifting eye 46 using a hook 52, shackle or other such rigging. Chains 45 span between plate 44 and frame 11, being attached to frame 11 using a plurality of shackles 47 as shown.

Figure 13A:
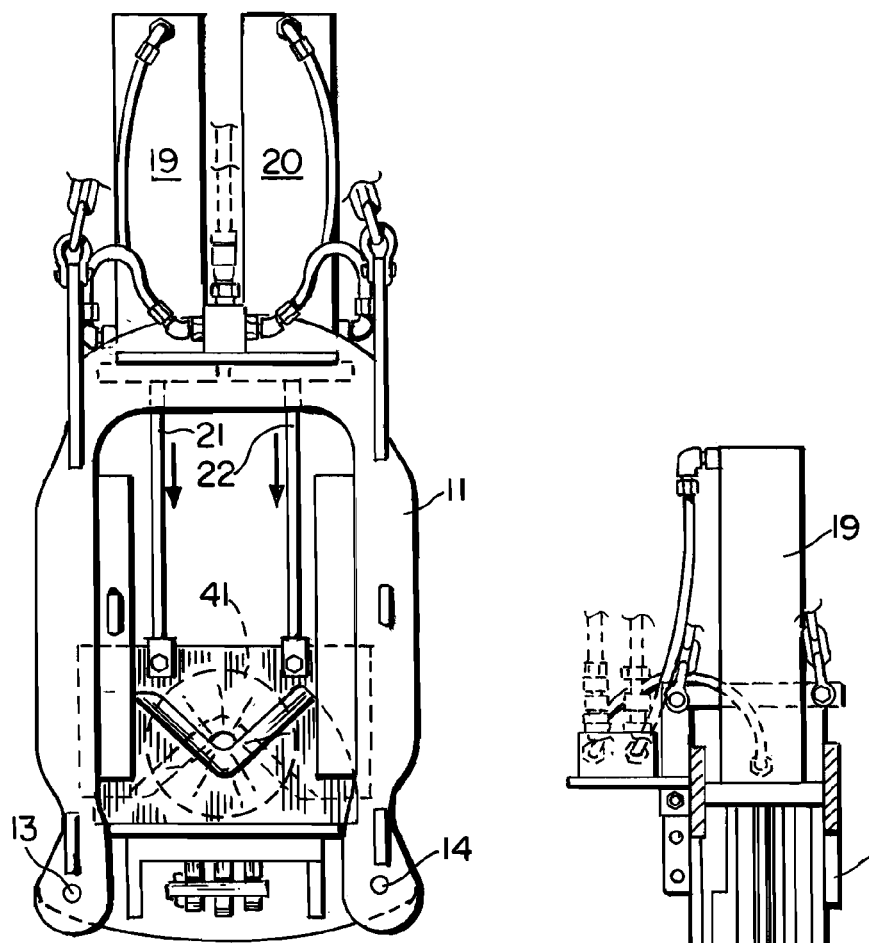
FIGS. 13A-13B are sequential schematic views that illustrate a cutting of a section of pipe.
Figure 13B:
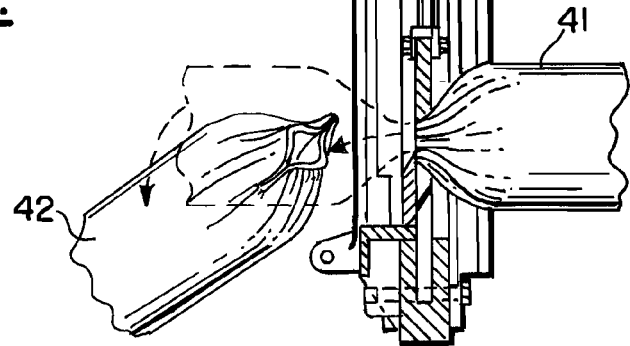

In FIGS. 12, 13A-13B, sequential views show the apparatus 10 of the present invention during a cutting of a length of pipe 41. Cutting begins in FIG. 12 when blades 23, 27 are spaced apart. The pipe 41 can initially be placed on fixed blade 27, and upon its edges 28, 29. In FIG. 13A, moving blade 23 begins to travel toward pipe 41 responsive to the extension of pushrods 21, 22 of cylinders 19, 20 (see arrows 53, FIGS. 13A, 13B). In FIG. 13B, the blade 23 slices through pipe 41. In FIG. 13B, the blade 23 has completed its full travel with pushrods 21, 22 being fully extended and a section of pipe 42 being a cut pipe section that has been severed from pipe 41.

Figure 14:
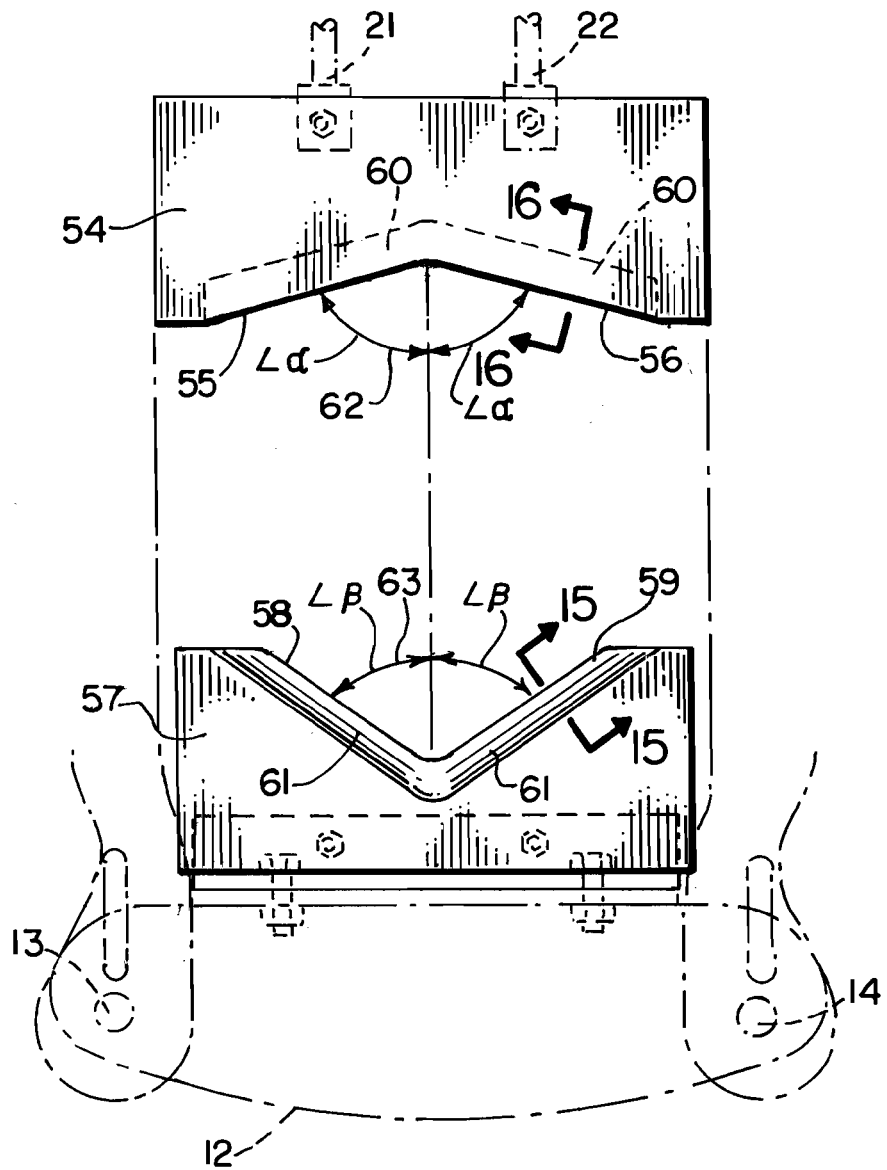
FIG. 14 is a partial plan view of the preferred embodiment of the apparatus of the present invention showing an alternate blade configuration.
Figures 15, 16:
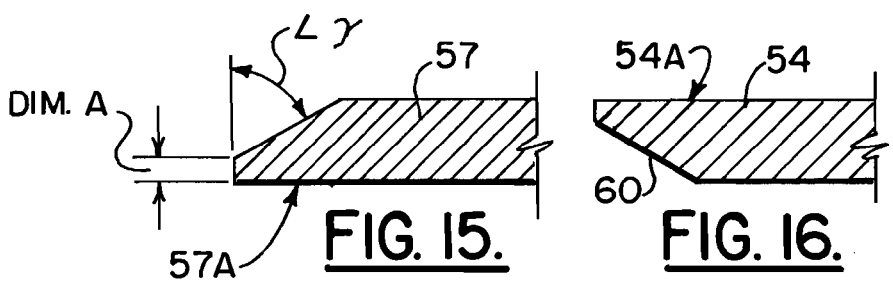
FIG. 15 is a sectional view taken along lines 15-15 of FIG. 14.
FIG. 16 is a sectional view taken along lines 16-16 of FIG. 14.

In FIGS. 14-16, a different blade arrangement is shown. The blade arrangement of FIGS. 14-16 can be substituted for the blade arrangement of FIGS. 7-9. In FIG. 14, a moving blade 54 is provided with cutting edges 55, 56. The blade 54 has a flat surface 54A opposite a bevel 60. Fixed blade 54 attaches to gate 12 as with the preferred blade of FIGS. 1-13B. Blade 54 has cutting edges 58, 59. A blade surface 57A is a flat surface that forms an acute angle with bevel 61. The blade 54 can provide an angle between cutting edges 55, 56 of between about 40 and 160 degrees which is indicated schematically by the arrow 62 in FIG. 14. The blade 57 can provide an angle 63 of between about 40 and 160 degrees.

Figure 17:
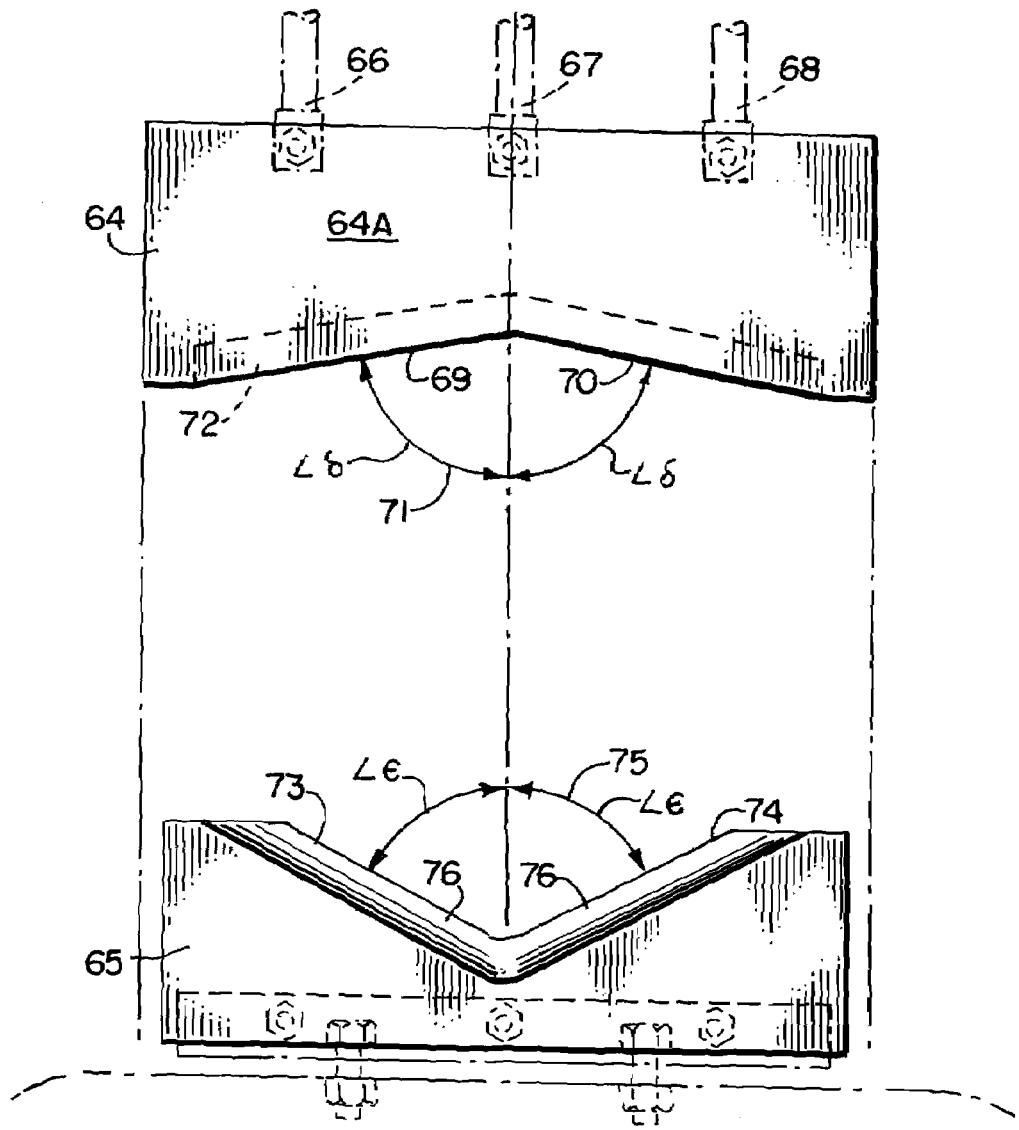
FIG. 17 is a partial plan view of the preferred embodiment of the apparatus of the present invention showing an alternate blade configuration.

In FIG. 17, yet another blade arrangement is shown that includes a moving blade 64 and a fixed blade 65. The moving blade 64 can be a wider blade than the blades of FIGS. 1-16, being driven by three push rods 66, 67, 68 each being powered by its own hydraulic cylinder and hoses as with the embodiment of FIGS. 1-16. The blade 64 has cutting edges 69, 70 that define an angle of between about 40 and 160 degrees, that angle being designated generally by the numeral 71 in FIG. 17. The moving blade 64 has a flat side and a side with a bevel 72 as with the embodiments of FIGS. 1-16. The fixed blade 65 has cutting edges 73, 74 that define an angle 75. Each of the cutting edges 73, 74 has a bevel 76. The blade 65 has a flat planar surface that is in an abutting relationship with the flat surface 64A of blade 64 as with the embodiments of FIGS. 1-16.

The following is a list of parts and materials suitable for use in the present invention.

PARTS LIST

| Part Number | Descrtion |
| --- | --- |
| 10 | pipe cutting apparatus |
| 11 | frame |
| 12 | gate |
| 13 | hinge |
| 14 | pinned connection |
| 15 | open center |
| 16 | opening end portion |
| 17 | closed end portion |
| 18 | handle |
| 19 | cylinder |
| 20 | cylinder |
| 21 | pushrod |
| 22 | pushrod |
| 23 | moving blade |
| 23A | planar, flat surface |
| 24 | edge |
| 25 | edge |
| 26 | beveled surface |
| 27 | fixed blade |
| 27A | planar, flat surface |
| 28 | edge |
| 29 | edge |
| 30 | beveled surface |
| 31 | angle |
| 32 | guide |
| 33 | guide |
| 34 | hydraulic flowline |
| 35 | hydraulic flowline |
| 36 | hydraulic flowline |
| 37 | hydraulic flowline |
| 40 | power unit |
| 41 | pipe |
| 42 | cut pipe section |
| 43 | lifting harness |
| 44 | spreader plate |
| 45 | chain |
| 46 | lifting eye |
| 47 | shackle |
| 48 | hydraulic flowline |
| 49 | hydraulic flowline |
| 50 | path of travel |
| 51 | lifting line |
| 52 | hook |
| 53 | arrows |
| 54 | blade |
| 55 | cutting edge |
| 56 | cutting edge |

-continued
PARTS LIST

| Part Number | Descrtion |
| --- | --- |
| 57 | blade |
| 57A | surface |
| 58 | cutting edge |
| 59 | cutting edge |
| 60 | bevel |
| 61 | bevel |
| 62 | angle |
| 63 | angle |
| 64 | moving blade |
| 64A | flat surface |
| 65 | fixed blade |
| 66 | pushrod |
| 67 | pushrod |
| 68 | pushrod |
| 69 | cutting edge |
| 70 | cutting edge |
| 71 | angle |
| 72 | bevel |
| 73 | cutting edge |
| 74 | cutting edge |
| 75 | cutting edge |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of salvaging an abandoned pipeline in a marine environment, comprising the steps of:
   a) providing a frame having a perimeter that surrounds a pair of opposed cutting blades, each cutting blade having a flat, planar surface and an opposing surface with a beveled cutting edge, the frame having a gate that enables the frame to be selectively placed around or removed from a section of pipeline to be cut;
   b) placing the frame on the pipeline by first opening the gate and then closing the gate;
   c) moving one of the cutting blades toward the other using hydraulics and until they overlap the other being fixed to the frame;
   d) wherein each cutting blade has a notched, v-shaped cutting blade;
   e) wherein in step "d" the pipeline is automatically centered within the respective notched, v-shaped blades prior to being severed as the blades advance relative to one another; and
   f) wherein guides hold the flat, planar surfaces of the blades together in an abutting, closely spaced face-to-face relationship, preventing deflection of the moving blade relative to the fixed blade in a direction that is lateral to the direction of travel of the moving blade.

2. The method of claim 1 wherein in step "d" at least one blade has a v-shaped blade that defines an angle of about 90 degrees and further comprising moving said blade relative to the frame.

3. The method of claim 1 wherein in step "d" at least one blade has a v-shaped blade that defines an acute angle and further comprising moving said blade relative to the frame.

4. The method of claim 1 wherein step "c" includes moving the blades with one or more hydraulic cylinders.

5. The method of claim 1 wherein step "c" includes moving the blades with a pair of hydraulic cylinders.

6. The method of claim 1 wherein in step "c" the advancing blade forms an opening with the fixed blade that is an ever decreasing size rectangle.

7. The method of claim 1 wherein one blade slides upon the frame in provided slots, and further comprising sliding one blade until it contacts and overlaps the other blade in step "c".

8. The method of claim 1 further comprising making a plurality of cuts in the pipeline after opening the gate to place the frame on the pipeline.

9. The method of claim 1 wherein the pipeline and frame are underwater in steps "b" through "e".

10. A method of salvaging a pipeline in a marine environment, comprising the steps of:
 a) providing a frame having a perimeter that surrounds first and second cutting blades, each blade having a first planar surface and a second surface with a beveled cutting edge, the flat, planar surfaces being in closely spaced abutting relationship during cutting, the frame having a gate that enables the frame to be selectively placed around or removed from a section of pipeline to be cut;
 b) placing the frame on the pipeline by first opening the gate and then closing the gate;
 c) moving the first cutter blade toward the second cutter blade using hydraulics and until they overlap;
 d) wherein each cutter blade has a notched, v-shaped cutting edge;
 e) wherein in step "d" the pipeline is centered before being cut by each v-shaped cutting edge; and
 f) using the fixed blade and guides in the frame to prevent movement of the first blade in a direction perpendicular to the fixed blade.

11. The method of claim 10 wherein in step "d" at least one blade has a v-shaped blade that defines an angle of about 90 degrees and further comprising moving said blade relative to the frame.

12. The method of claim 10 wherein in step "d" at least one blade has a v-shaped blade that defines an acute angle and further comprising moving said blade relative to the frame.

13. The method of claim 10 wherein step "c" includes moving the blades with one or more hydraulic cylinders.

14. The method of claim 10 wherein step "c" includes moving the blades with a pair of hydraulic cylinders.

15. The method of claim 10 wherein in step "c" the advancing blade forms an opening with the fixed blade that is an ever decreasing size rectangle.

16. The method of claim 10 wherein one blade slides upon the frame in provided slots, and further comprising sliding one blade until it contacts and overlaps the other blade in step "c".

17. The method of claim 10 further comprising making a plurality of cuts in the pipeline after opening the gate to place the frame on the pipeline.

18. The method of claim 10 wherein the pipeline and frame are underwater in steps "b" through "e".

19. A marine pipeline salvaging apparatus, comprising:
 a) a frame having a perimeter that surrounds a pair of opposed cutting blades, each cutting blade having a flat, planar surface and an opposing surface with a beveled cutting edge, the frame having a gate that enables the frame to be selectively placed around or removed from a section of pipeline to be cut and salvaged;
 b) a lifting apparatus for lifting and placing a frame on the pipeline to be salvaged;
 c) one of the cutting blades being powered with hydraulics to move toward the other, until they overlap;
 d) wherein one of the blades is a fixed, non-moving blade and each blade has a notched, v-shaped cutting blade;
 e) means for automatically centering the pipeline to be salvaged within the respective notched, v-shaped blades prior to being severed as the blades advance relative to one another; and
 f) guides that hold the flat, planar surfaces of the blades together in an abutting, closely spaced face-to-face relationship, preventing deflection of the moving blade relative to the fixed blade in a direction that is lateral to the direction of travel of the moving blade.

20. The marine pipeline salvaging apparatus of claim 19 wherein at least one blade has a v-shaped blade that defines an angle of about 90 degrees.

21. The marine pipeline salvaging apparatus of claim 19 wherein in step "d" at least one blade has a v-shaped blade that defines an acute angle and further comprising moving said blade relative to the frame.

22. The marine pipeline salvaging apparatus of claim 19 wherein step "c" includes moving the blades with one or more hydraulic cylinders.

23. The marine pipeline salvaging apparatus of claim 19 wherein step "c" includes moving the blades with a pair of hydraulic cylinders.

24. The marine pipeline salvaging apparatus of claim 19 wherein in step "c" the advancing blade forms an opening with the fixed blade that is an ever decreasing size rectangle.

25. The marine pipeline salvaging apparatus of claim 19 wherein one blade slides upon the frame in provided slots, and further comprising sliding one blade until it contacts and overlaps the other blade in step "c".

26. The marine pipeline salvaging apparatus of claim 19 further comprising making a plurality of cuts in the pipeline after opening the gate to place the frame on the pipeline.

27. The marine pipeline salvaging apparatus of claim 19 wherein the pipeline and frame are underwater in steps "b" through "e".

28. A marine pipeline salvaging system, comprising:
 a) a frame having a perimeter;
 b) first and second cutting blades mounted to the frame, each blade having a first planar surface and a second surface with a beveled cutting edge, the flat, planar surfaces being in closely spaced abutting relationship during cutting;
 c) a gate that enables the frame to be selectively placed around or removed from a section of pipeline to be cut;
 d) a lifting device that enables placement of the frame on a pipeline by first opening the gate and then closing the gate;
 e) wherein the first cutter blade moves toward the second cutter blade using hydraulics and until they overlap;
 f) wherein each cutter blade has a notched, v-shaped cutting edge;
 g) wherein the pipeline is automatically centered before being cut by each v-shaped cutting edge; and
 h) guides on the frame that prevent movement of the first blade in a direction perpendicular to the fixed blade.

29. The system of claim 28 wherein at least one blade has a v-shaped blade that defines an angle of about 90 degrees.

30. The system of claim 28 wherein at least one blade has a v-shaped blade that defines an acute angle.

31. The system of claim 28 wherein one or more hydraulic cylinders moves the blades relative to one another.

32. The system of claim 28 wherein one of the blades is a moving blade that is moved relative to the frame by extension of a pair of hydraulic cylinders.

33. The system of claim 28 wherein the advancing blade forms an opening with the fixed blade that is an ever decreasing size rectangle as the hydraulic cylinders extend.

34. The system of claim 28 wherein one blade slides upon the frame in provided slots, until it contacts and overlaps the other blade.

35. The system of claim 28 wherein the blades contact the pipeline at four locations.

36. The system of claim 28 wherein each blade contacts the pipeline at two locations.

* * * * *